Jan. 25, 1955
W. H. SCHOMERS
2,700,427
SKI MOUNTED VEHICLE
Filed June 6, 1949
3 Sheets-Sheet 1
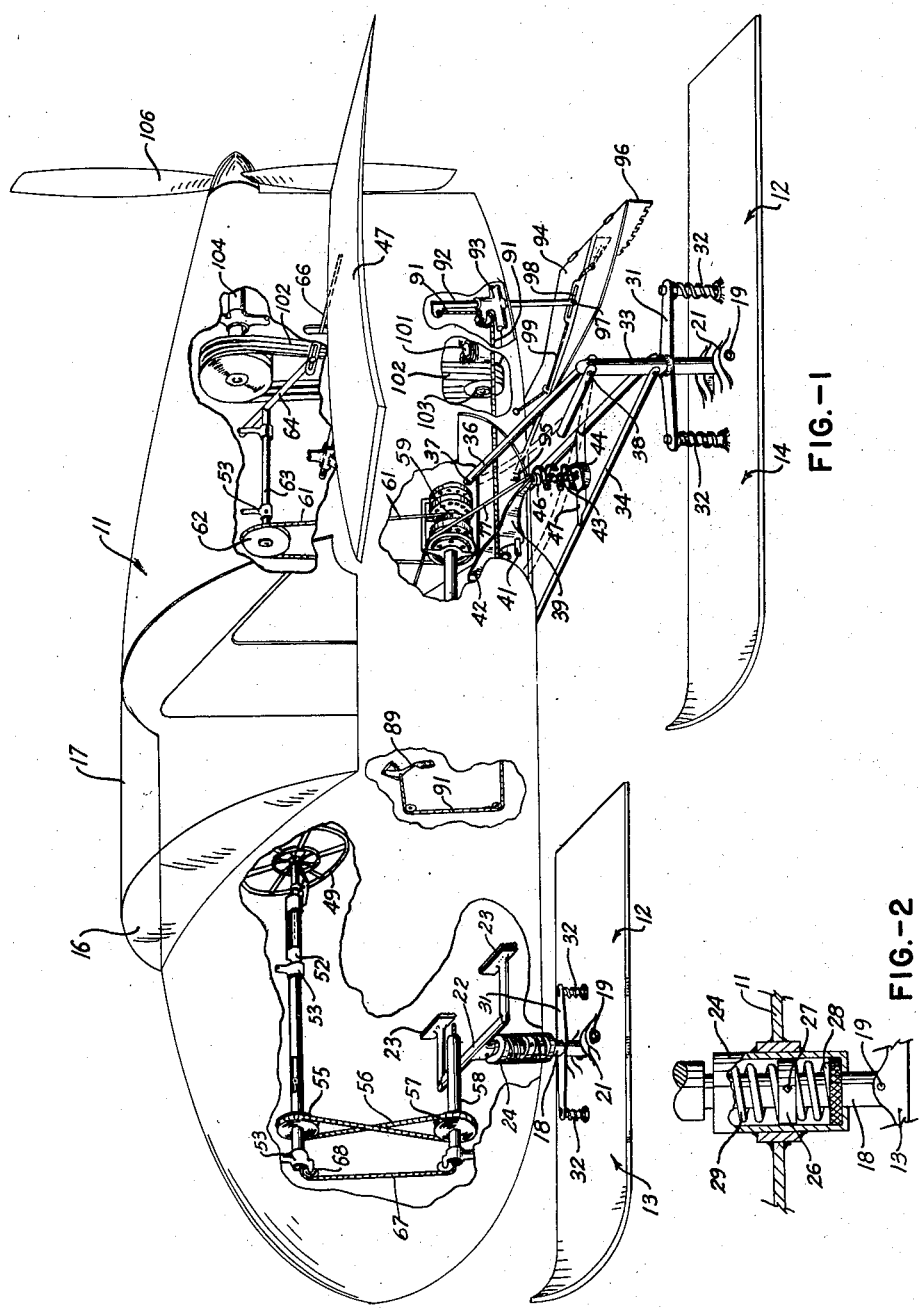
INVENTOR.
William H. Schomers
BY
ATTORNEY Jan. 25, 1955  W. H. SCHOMERS  2,700,427
SKI MOUNTED VEHICLE Filed June 6, 1949  3 Sheets-Sheet 2

INVENTOR.
William H. Schomers
BY
ATTORNEY

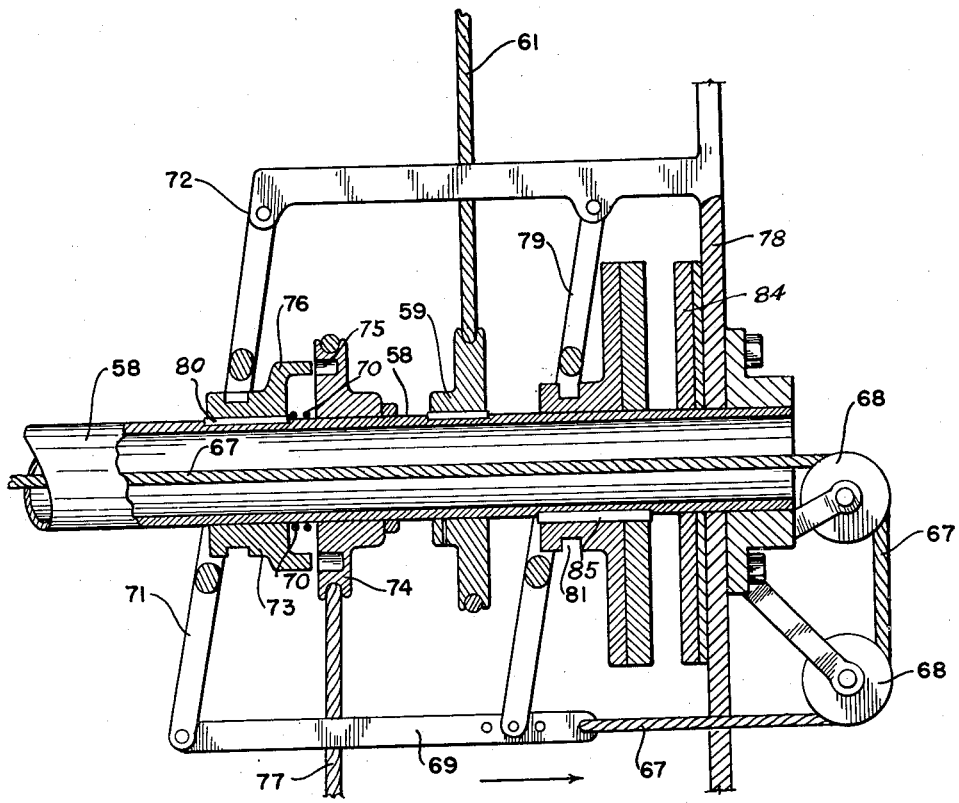
FIG. — 7

United States Patent Office 2,700,427
Patented Jan. 25, 1955

2,700,427

SKI MOUNTED VEHICLE

William H. Schomers, Edgewater, Colo.

Application June 6, 1949, Serial No. 97,434

4 Claims. (Cl. 180—3)

My invention pertains to a ski mounted vehicle and more particularly to special means for mounting the skis with respect to the structure of said vehicle so as to facilitate the making of sharp turns. In addition, my invention pertains further to other and novel arrangements for various structural features of a ski mounted vehicle.

Previously many different types of ski mounted vehicles have been devised and though some have been relatively successful in their field all of the former types have been handicapped inasmuch as the final derived structure was not as maneuverable as it should be to traverse the large and irregular expanses of the snow and ice surfaces for which this type of vehicle is suited. This lack of maneuverability is caused chiefly by the absence of means for turning the ski mounted vehicles through relatively sharp angles of turn. Likewise relatively high centers of gravity in the prior types have limited the maneuverability of the respective vehicles. Without this requisite maneuverability and stability the present ski vehicles are limited in the type of terrain over which they may be used or are restricted to speeds which make the type of propelling means which is necessary extremely inefficient. Actually other inventors have tried to solve this particular problem of maneuverability, but it is believed that the present solution provides means that merit increased general acceptance by reason of the simplicity of design and construction.

Accordingly while it is a main object of this invention to provide a ski mounted vehicle that is relatively maneuverable, the inventor has also kept as an object the attainment of maneuverability without the addition of excessive weight or intricate mechanisms which are costly to machine.

Another object of this invention is to provide a novel vehicle supporting arrangement which automatically changes the transverse angular position of the skis in accordance with movement of the vehicle frame about its longitudinal axis. At least two other beneficial objects are satisfied by reason of this movement inasmuch as the center of gravity of the vehicle is shifted toward the center of turn at the same time as the inner edges of the skis are caused to angularly engage the snow or ice supporting surface.

A further object of this invention is to provide novel ski supporting means which incorporate the use of members of sufficient resilience to dampen the shocks ordinarily coincident with use of such ski mounted vehicles over rough terrain.

A still further object of this invention is to provide a steering mechanism which serves to turn the vehicle through relatively sharp turns at either high or low vehicle speeds by use of hinged aileron members at high speeds and by use of the ailerons and a special linkage mechanism at low speeds.

Another object of this invention is to provide a mechanism for braking the ski mounted vehicle to a stop and similar mechanism for locking the vehicle in its parked position even if on uneven terrain.

A further object of this invention is to provide a ski mounted vehicle having a low center of gravity that may be shifted to the inside of turns being negotiated or that may be shifted to a position of greater stability with respect to the ski supports when the vehicle is on a side hill.

Other objects and advantages of this invention will be apparent from the appended description and drawings in which:

Fig. 1 is a perspective view in partial section of the general arrangement of this invention;

Fig. 2 is an elevation in partial section showing the front ski strut support;

Fig. 7 is a cross sectional elevation taken along a center line of Fig. 4.

Figure 3:
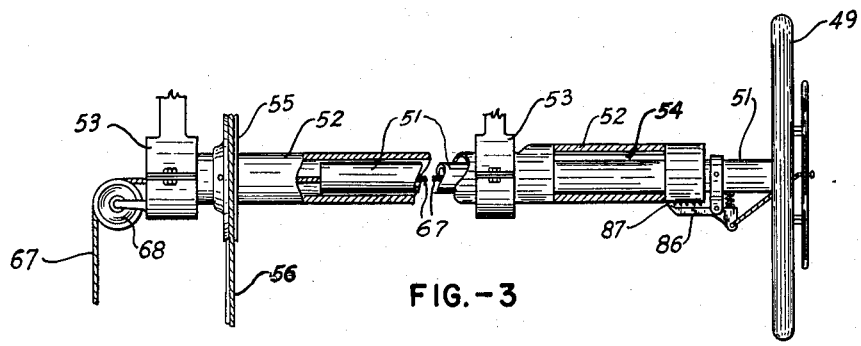
Fig. 3 is an elevation in partial section showing a portion of the vehicle steering mechanism.

Briefly stated this invention provides a ski mounted vehicle having a passenger supporting frame and suitable propulsion drive means. Preferably a tripod ski arrangement is used in which the two rear skis are attached for pivotal movement to outrigger members which are themselves pivotally engaged with the frame of the ski vehicle. A special linkage arrangement likewise interconnects the ski supporting strut and the frame in such manner that when the vehicle is guided into a turn and the frame is caused to roll about its lonigtudinal axis, the edges of the skis nearest to the center of turn will be tilted downwardly into the vehicle supporting surface in much the same manner observed when an experienced skier executes a sharp turn. Rotation of the vehicle frame also causes the center of gravity of the vehicle to be shifted to the inside of the turn thus making it possible to execute even shorter turns.

At high speeds such rotation or rolling of the vehicle frame is to be accomplished by changing the angular position of ailerons hingedly mounted on the opposite sides of the frame. At slower speeds when the effectiveness of the passing air stream is reduced, the same steering wheel which is used to change the angular position of the ailerons may be moved reciprocally to engage a positive drive mechanism to cause relative movement between the ski supports and the vehicle frame.

This invention further provides a drag brake of novel arrangement which may serve to stop the forward movement of the ski mounted vehicle when desired. Likewise, a positive locking mechanism is provided for use with the positive turn features of this invention which enables the operator of the vehicle to lock the skis in their angular position thereby making it possible to stop and hold this vehicle on a side hill.

Referring now to Fig. 1 in which the general arrangement of the component features of this invention is shown, it will be noticed that the vehicle frame 11 is supported generally by three skis 12 arranged in a conventional type of tripod mount in which a single guide ski 13 is mounted forwardly of the main support skis 14. Preferably the vehicle frame 11 is of an aircraft type structure to provide a relatively light weight unit. Accordingly either a tubular skeleton and fabric covering thereon may be used or a regular stressed skin type of structure may be utilized. The frame structure itself is so arranged as to provide a passenger compartment separate from the other compartments devoted to the carrying of freight and supplies and other enclosed space containing the mechanisms used to drive and operate the ski mounted vehicle of this invention. The passenger enclosure preferably provides a seat or seats in which an operator and other passengers as desired may be comfortably seated. A windshield 16, a canopy enclosure 17 and other similar conveniences are provided for the passengers of the vehicle 11.

The frame 11 is supported on the skis 12 by means of separate novel supporting mechanisms. The front ski 13 is attached to a single strut 18, the axis of which is directed along the vertical axis of the frame. The strut 18 is pivoted at its lower terminal end to the ski 13 by means of a pivot pin 19 attached to the strut 18 and passing through bosses 21 on ski 13. The bosses 21 and the holes therein are so arranged that the axis of the pivot pin 19 is at right angles to the longitudinal axis of the ski 13. The upper end of the strut 18 is engaged to a cross bar 22 which is connected to foot pedals 23. It will be apparent from this arrangement that whenever it is desired to turn the ski with respect to the longitudinal axis of the frame, foot pressure is applied selectively to the foot pedals 23 to rotate the strut 18, the pivot pin 19, and the ski 13.

Separate means are provided to absorb any shocks that would normally be transmitted through the strut 18. The actual arrangement of this shock absorbing structure is shown in Fig. 2. In this figure it will be noted that the strut 18 passes through a cylindrical member 24 which is rigidly attached to the frame 11 as by welding or the like. A collar 26 is passed over the strut 18 and engaged in fixed position with respect thereto by means of a pin 27, a set screw or the like. Separate springs 28 and 29 are placed respectively above and below the collar 26 in such manner that movement of the strut tends either to compress the lower spring 28 between the collar 26 and the cylindrical member 24, or the upper spring 29 between the opposite face of the collar 26 and the member 24.

In addition to the double acting shock absorbing spring mechanism described, further means are provided for absorbing minor shocks and preventing undue dislocation of the ski with respect to the strut 18. The mechanism to serve this purpose is inclusive of a stabilizer bar 31 attached to the strut 18 and arranged at right angles to the pivot pin 19. Stabilizer springs 32 serve to interconnect the opposite ends of the stabilizer 31 with the upper surface of the ski 13 so as to prevent any extensive pitching of the ski 13 due to unbalance about the pivot pin 19 whenever the ski 13 raises out of contact with the vehicle supporting snow, ice or ground.

The main support skis 14 are connected to the frame 11 by means of a novel mechanism and linkage arrangement. Each of the separate skis 14 is pivotally attached to a strut 33 at a point behind the natural center of balance by means of a pivot pin 19 disposed transversely of the longitudinal axis of the skis 14 and rotatably engaged in bosses 21 formed on the skis 14. In a manner similar to that previously described, a stabilizer 31 rigidly attached to the struts 33 provides bearing surfaces against which the fore and aft stabilizer springs 32 are engaged to prevent the ski tip from digging into the snow due to unbalance of the ski whenever the ski is raised out of contact with the ground.

The struts 33 are pivotally engaged with outriggers 34 which extend outwardly away from the vehicle frame 11 at right angles to the longitudinal axis of the vehicle. The outriggers themselves are pivotally connected to the frame 11 by means of pivots 35 in such manner as to allow for relative movement between the outriggers and the frame 11 whenever the frame is caused to roll about its longitudinal axis. A linkage mechanism 36 similar in form to the outriggers 34 and positioned above the outriggers 34 is also pivotally interconnected to the frame 11 by pivots 37 and to the struts 33 by pivots 38. When properly arranged the outriggers, the strut, the linkage mechanisms and the portion of the frame between the pivots 35 and 37 represent in toto a parallel linkage arrangement of such nature that whenever the portion of the frame between the respective pivots 35 and 37 is rotated through an angle, the struts 33 secured to the skis 14 will be rotated through a corresponding angle in such manner that the struts 33 will always be parallel to the vertical axis of the frame 11 which in the embodiment shown corresponds to a plane passing through the top and bottom surfaces of frame 11 dividing such frame into geometrically symmetrical half portions.

In order to absorb the shocks coincident with use of this type of ski mounted vehicle in rough terrain, a yoke member 39 is rotatably mounted on a shaft 41 having an axis parallel to the longitudinal axis of the frame 11. The arms 42 of the yoke 39 therefore extend outwardly at right angles to the longitudinal axis of the frame 11 and since the yoke 39 is positioned between the outriggers 34 the arms 42 extend outwardly between the outriggers 34 and the linkage mechanism 36. Concentric inner and outer coil springs 43 and 44 respectively are placed for tension and compression between a bearing surface 46 at the outer extremities of each of the arms 42 and a cross member 47 mounted between the outriggers 34 to transmit the weight of the vehicle from the outriggers 34 to the yoke 39. In order to obtain a proper shock absorbing action while still maintaining the outriggers and skis in a normal non-tilted position under no load conditions the inner spring 43 is preferably installed under an initial tensioning force. By means of this arrangement any shock force such as that occasioned by passing over a small rise in the terrain is absorbed by compression of both sets of springs at the opposite ends of the yoke 39 even though only one ski 14 is raised out of its normal running position. As soon as the sharp rise has been passed the ski 14 will return to its normal running position and but little of the shock absorbed by the ski 14 will be transmitted to the frame 11 through the outriggers 34 or the longitudinal yoke supporting shaft 41.

By means of the parallel linkage arrangement described it will be apparent that the skis 14 may be tilted to engage the supporting ground, snow or ice at an angle. This tilting of the skis is accomplished by rotating the frame 11 about its longitudinal axis. If the frame can be caused to rotate inwardly toward the center of the intended radius of turn, the tilting of the skis will be of such a nature as to facilitate the making of the turn. Actually this invention provides means for tilting the skis in this manner to assimilate the ski tilting action that a skier uses whenever he executes a sharp turn. This tilting of the skis makes it much easier to execute a turn, and it is readily apparent that such result is desirable.

For this purpose I provide separate but cooperative means for causing the skis to be tilted, the selective use of which is dependent on the speed of travel for the vehicle 11. At relatively high speeds the frame 11 is caused to roll about its longitudinal axis by use of the air pressure forces exerted on hinged ailerons 47 and 48 by the passing air stream.

Figure 4:
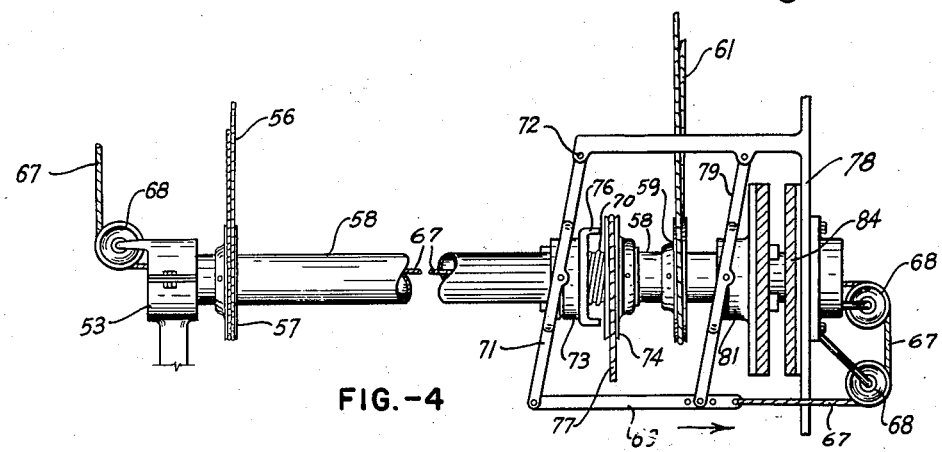
Fig. 4 is an elevation showing other features of the steering mechanism.
Figures 5, 6:
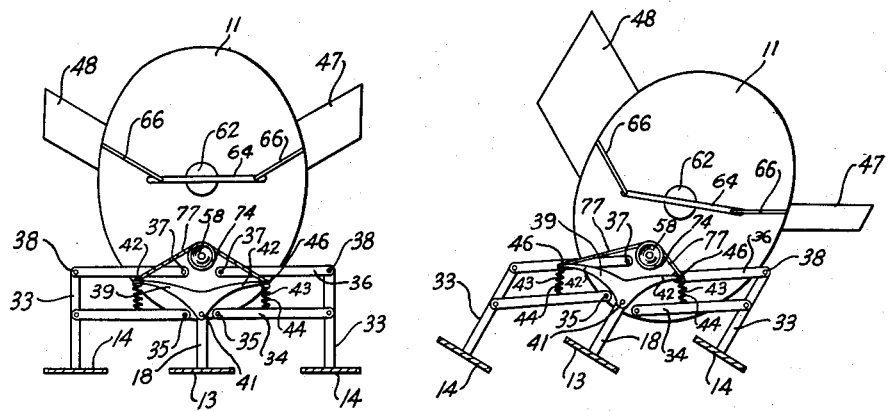
Fig. 5 is a diagrammatic view of the ski support and steering mechanism when the vehicle is in a head-on position.
Fig. 6 is a diagrammatic representation of the ski support and steering mechanism when the vehicle is in a left turn at slower speeds.

If we consider the air foil on the left side of the vehicle frame 11 when looking toward the front as aileron 47 and that on the opposite side as aileron 48, the means for changing the position of these ailerons 47 and 48 will be best described with reference to Figs. 1, 3, 4, 5 and 6. In these figures it is shown that steering wheel 49 attached to a shaft 51 is received within tubular member 52 which is in turn mounted for rotation in bearings 53 attached to the vehicle frame 11. A key 54 and key-way arrangement is provided to cause rotation of the tubular member 52 whenever the shaft 51 is rotated even though the key 54 provides for reciprocal movement of the shaft 51. Whenever the wheel 49 is rotated to rotate the shaft 51 and thereby the tubular member 52, a pulley 55 rigidly attached to the tubular member 52 is caused to rotate. A crossed transmission member 56 interconnects the pulley 55 with a pulley 57 mounted on a separate rotatable shaft 58 positioned below the shaft 52 and supported by other bearing members 53 rigidly attached to the frame 11. When the lower shaft 58 is rotated another pulley 59 is caused to rotate thereby causing movement of a second transmission member 61. Transmission member 61 causes rotation of a pulley 62 which is attached to a shaft 63 supported by other bearing members 53. The shaft 63 is itself connected to a cross bar 64 which rotates whenever the pulley 62 is rotated. The respective ends of the cross bar 64 are interconnected with members 66 attached to the respective ailerons 47 and 48 by means of a pin and slot arrangement. As seen in Figs. 1, 5 and 6 rotation of the pulley 62 causes the cross bar 64 to raise and lower the opposite members 66. If the steering wheel 49 is turned to the left, aileron 47 would be moved upwardly with respect to its hinge point while aileron 48 would be moved downwardly with respect to its hinge point. This result is obtained since the transmission member 56 is crossed as shown in Fig. 1.

As the passing air stream engages the surfaces of the ailerons 47 and 48 when in this adjusted position the resultant air pressures will tend to roll the frame 11 to the operator's left with respect to its longitudinal axis. As the frame rolls to the left the skis 14 will be tilted as shown in Fig. 6 and also the center of gravity of the vehicle will be moved toward the left, which is also toward the center of the turn. At the same time rudder pedals 23 are moved to rotate strut 18 and ski 13 to facilitate the making of the turn. When it is desired to execute a right turn the wheel is turned to the right and all the previously described operations are reversed to cause an opposite tilting of the skis and a corresponding shift of the center of gravity of the vehicle to the right.

At lower speeds when the air stream resulting from the relative movement of the vehicle over the supporting ground is insufficient to cause movement of the center of gravity through the agency of the ailerons 47 and 48, a positive weight shifting mechanism is employed. This mechanism too is best described in conjunction with Figs. 1, 3, 4, 5 and 6. In Fig. 3 it will be noticed that the shaft 51 upon which the steering wheel 49 is mounted is connected to a flexible cable 67 which passes over pulleys 68, through the tubular members 52 and 58 and thence back to a clutch engaging apparatus as shown in Figs. 4 and 7. If the wheel 49 is pulled backwardly toward the vehicle operator, the cable 67 will be tensioned to cause movement of the bar 69 in the direction indicated by the arrow. As the bar 69 moves in this indicated direction a shifting fork 71 which is in sliding engagement with a dog clutch 73 is caused to rotate about its upper pivot point 72 to compress spring 70 and move clutch 73 into engagement with pulley 74. When the clutch 73 and pulley 74 are moved toward each other the tangs 76 on the clutch 73 engage cooperative recesses 75 in the face of the pulley 74.

Since the clutch 73 is slidably secured by means of a key 80 for rotation with the shaft 58 and since rotation of the wheel 49 causes rotation of the shaft 58 in the manner previously described, the pulley 74 which normally rides free of the shaft 58 will be caused to rotate with the shaft 58 when the tangs 76 are received in recesses 75. This resultant movement of the pulley 74 is utilized by passing a cable 77 over the pulley 74 and by engaging the opposite ends of the cable 77 to the laterally disposed arms 42 of the yoke 39. If the wheel 49 is rotated to the left the shaft 58 will be rotated to the right and the portion of the cable attached to the left arm of the yoke will be shortened thereby causing the end of the arm 42 to be rotated about the shaft 41. This movement will cause the frame 11 to be rotated to the operator's left about its longitudinal axis and the left ski 14 will again be tilted to the position shown in Fig. 6. At the same time that the one section of the cable is shortened the opposite end thereof will be lengthened and the right ski will accordingly also assume the position shown in Fig. 6.

The strut supporting the center ski, as previously explained, is engaged with members rigidly attached to the frame and is aligned with the vertical axis of the frame. By reason of this attachment the center ski 13 will itself be tilted as shown in Fig. 6. Also, since the wheel 49 was rotated to the left and since the connections between the wheel and the ailerons provide for positive movement only, the ailerons will also assume the position necessary for executing a left turn at high speeds as previously explained. Any air pressures which result from the passing air stream will tend to aid the execution of the turn even at low speeds.

Besides tilting the skis and moving the ailerons the above described procedure also tends to shift the center of gravity of the vehicle toward the center of turn. This shift of the center of gravity makes it possible for the applicant's device to execute even sharper turns than those that would be possible where only the skis are tilted. When the center of gravity is moved toward the center of turn, the tendency of the vehicle to skid sideways under the resultant centrifugal forces is lessened to a considerable extent and even relatively sharp turns may then be made at high speeds.

It will be apparent that this same ski tilting arrangement may be beneficially used when it is desired to operate the ski vehicle on steeply sloping hills. On such terrain the wheel may be pulled toward the operator and turned to maintain the vehicle frame on an even keel while traversing the hillside. During such use the center ski 13 will be maintained in a straight ahead position unless it is desired to turn the vehicle.

One further advantage of this invention is possible by reason of the structure shown in Figs. 4 and 7. Plate 78 is rigidly attached to the frame 11 to provide the necessary fulcrum for the shifting fork 71 and for a further shifting fork 79. The shifting fork 79 slidably engages a clutch plate 81 which is affixed to the shaft 58 by means of a key 85 to rotate therewith but which may be moved reciprocally with respect thereto. During the initial movement of the cable 67 as the wheel 49 is moved toward the operator the clutch 73 will be engaged with the pulley 74 as explained, but any further movement of the cable 67 causing further movement of the bar 69 causes the shifting fork 79 to move the clutch plate 81 into engagement with the face of the plate 84. When these plates are moved into their locked position the spring loaded catch 86 adjacent the steering wheel 49 will engage notches 87 tending to secure the wheel in its extended position.

It will be apparent that the wheel can first be moved out an intermediate distance and turned to cause positive tilting of the skis before it is pulled further to lock the clutch plate 81 and plates 84 together. Thus the skis may be locked in any of their adjusted positions. This feature is of special utility where it is desired to stop the vehicle while on a side hill. When in such position the skis can be so tilted as to maintain the vehicle frame in a true vertical position even though the skis are in contact with a steeply slanting slope.

Still further means are provided for braking the vehicle 11 to a stop. This mechanism is inclusive of a hand brake 89 which is attached to a control cable 91. Control cable 91 passes longitudinally of the frame 11 back to a brake extension rod 92. The brake extension rod 92 is itself mounted for reciprocal movement in a socket member 93 rigidly attached to the frame 11 in such manner that tensioning of the cable 91 causes the brake rod 92 to be moved downwardly with respect to the frame 11. A drag brake member 94 having a hinged extension 96 thereon is engaged by means of pivot pin 95 to the frame 11 at a position forwardly of the brake rod 92. The end of the brake rod 92 is engaged by means of a pin 97 with a slot 98 in the drag brake 94 in such manner that extension of the brake rod 92 will cause the drag brake 94 to be moved downwardly into engagement with the snow or ice structure which supports the skis 12. As the drag brake is moved downwardly a cable 99 which is of fixed but adjustable length and which is connected between the frame 11 and the drag brake extension 96 is tensioned to cause the hinge extension 96 to be bent downwardly with respect to the drag brake 94. As this hinged extension 96 is bent downwardly it will engage the vehicle supporting surface at a more acute angle, thereby tending to halt the forward movement of the vehicle. If the vehicle is passing over loose snow the drag brake will still be effective inasmuch as the brake will be engaging snow that has been packed by the front ski. This drag brake 94 is also of obvious utility whenever it is desired to rev up the propeller or test any other type of motive power being used without movement of the vehicle.

For the embodiment shown the applicant has provided a propeller drive, however it should be noted that the driving power of the engine 101 is transmitted by a belt 102 and pulley 103 arrangement to the propeller shaft 104 which is located in a position that will give adequate clearance for the propeller 106. This belt transmission arrangement is used so the engine 101 may be placed near the bottom of the frame 11 to assure a low center of gravity for the vehicle.

The combined usage of all the novel features of this invention provides a ski mounted vehicle that is more maneuverable and therefore of greater utility than those previously known to the art. In addition it is believed that the features as herein described represent a serviceable and efficient embodiment of this invention. However it should be understood that inasmuch as this invention is adaptable to certain modifications and changes the applicant does not wish to be limited to the specific forms and arrangements shown and described, but intends only to be limited within the scope of the hereunto appended claims.

What is claimed is:

1. A ski mounted vehicle comprising a frame, outriggers pivotally attached to said frame, ski support struts pivotally attached to said outriggers, linkage means pivotally interconnecting said frame and said struts to form with said frame, outrigger and strut a parallelogram mechanism, skis on the lower end of said struts, ailerons hingedly mounted on said frame at the opposite sides thereof, a shaft member rotatably mounted within said frame, means attached to said shaft for oppositely adjusting the position of said ailerons, a wheel member for rotating said shaft, means interconnecting said wheel and said parallelogram mechanism for changing the positioning thereof with respect to said frame and motive means for propelling said vehicle, rotation of said wheel effectively tilting the skis and adjusting the ailerons to facilitate the making of desired turns.

2. A ski mounted vehicle comprising, a frame, outriggers pivotally attached to said frame, ski support struts pivotally attached to said outriggers, linkage means pivotally interconnecting said frame and said struts to form with said frame, outrigger and strut a parallelogram mechanism, skis on the lower end of said struts, a shaft disposed longitudinally of said frame, a yoke member mounted for rotation on said shaft having arms positioned between said outriggers and linkage means and extending laterally beyond the point of pivotal attachment between said frame and outriggers, resilient members interconnecting said outriggers and said yoke, a steering member mounted for rotational and reciprocal movement, tension members interconnecting said steering member and said outriggers for positively changing the position of said outriggers with respect to said frame upon rotation of said steering member, means operative upon reciprocal movement of said steering member for locking said outriggers and said yoke in their adjusted positions, and motive means for propelling said vehicle, said parallelogram mechanism being adapted to tilt the skis when the steering member is rotated so that the ski edges nearest the center of a desired turn will engage the vehicle supporting surface at an angle.

3. A ski mounted vehicle comprising a frame, outriggers pivotally attached to said frame, ski support struts pivotally attached to said outriggers, linkage means pivotally interconnecting said frame and said struts to form with said frame, outrigger and strut a parallelogram mechanism, skis on the lower end of said struts, ailerons hingedly mounted on said frame at the opposite sides thereof, a shaft member rotatably mounted within said frame, linkage means attached to said shaft for oppositely adjusting the position of said ailerons, a wheel member for rotating said shaft, a main shaft disposed longitudinally of said frame, a yoke member mounted for rotation on said shaft having arms positioned between said outriggers and linkage means and extending laterally beyond the point of pivotal attachment between said frame and outriggers, resilient members interconnecting said outriggers and said yoke, tension members interconnecting said outriggers with said main shaft for positively changing the position of said outriggers with respect to said frame, means interconnecting said main shaft and wheel, and motive means for propelling said vehicle, said parallelogram mechanism being adapted to tilt the skis when the said wheel is rotated so that the ski edges nearest the center of a desired turn will engage the vehicle supporting surface at an angle.

4. A ski mounted vehicle comprising a frame, outriggers pivotally attached to said frame, ski support struts pivotally attached to said outriggers, linkage means pivotally interconnecting said frame and said struts to form with said frame, outrigger and strut a parallelogram mechanism, skis on the lower end of said struts, a shaft disposed longitudinally of said frame, a yoke member mounted for rotation on said shaft having arms positioned between said outriggers and linkage means and extending laterally beyond the point of pivotal attachment between said frame and outriggers, resilient members interconnecting said outriggers and yoke, a control wheel for said vehicle, ailerons rotatably mounted on said vehicle at the opposite sides thereof, means interconnecting said control wheel and ailerons for adjusting the angularity thereof with respect to said frame, and means selectively interconnecting said control wheel and outriggers for adjusting the position of said outriggers with respect to said frame to control the tilt of said skis when desired, said interconnecting means being disengageable when it is desired to operate said vehicle without direct control of the relative positioning of said parallelogram mechanism and said frame.

References Cited in the file of this patent

UNITED STATES PATENTS

| | | |
|---|---|---|
| 1,431,440 | Burch | Oct. 10, 1922 |
| 1,782,508 | James | Nov. 25, 1930 |
| 1,836,623 | Silvestri | Dec. 15, 1931 |
| 1,946,018 | Fredrickson | Feb. 6, 1934 |
| 2,063,812 | James | Dec. 8, 1936 |
| 2,085,295 | Campbell | June 29, 1937 |
| 2,259,804 | Davis et al. | Oct. 21, 1941 |
| 2,260,102 | Freret | Oct. 21, 1941 |
| 2,331,561 | Marr | Oct. 12, 1943 |
| 2,544,462 | Lipnicki | Mar. 6, 1951 |
| 2,582,858 | Capiak | Jan. 15, 1952 |

FOREIGN PATENTS

| | | |
|---|---|---|
| 31,392 | Switzerland | June 14, 1904 |
| 145,814 | Switzerland | Mar. 15, 1931 |